No. 650,999. Patented June 5, 1900.
J. F. ULRICHS.
MACHINE FOR SEPARATING SHELLS FROM KERNELS OF NUTS.
(Application filed Dec. 11, 1899.)
(No Model.) 2 Sheets—Sheet 1.
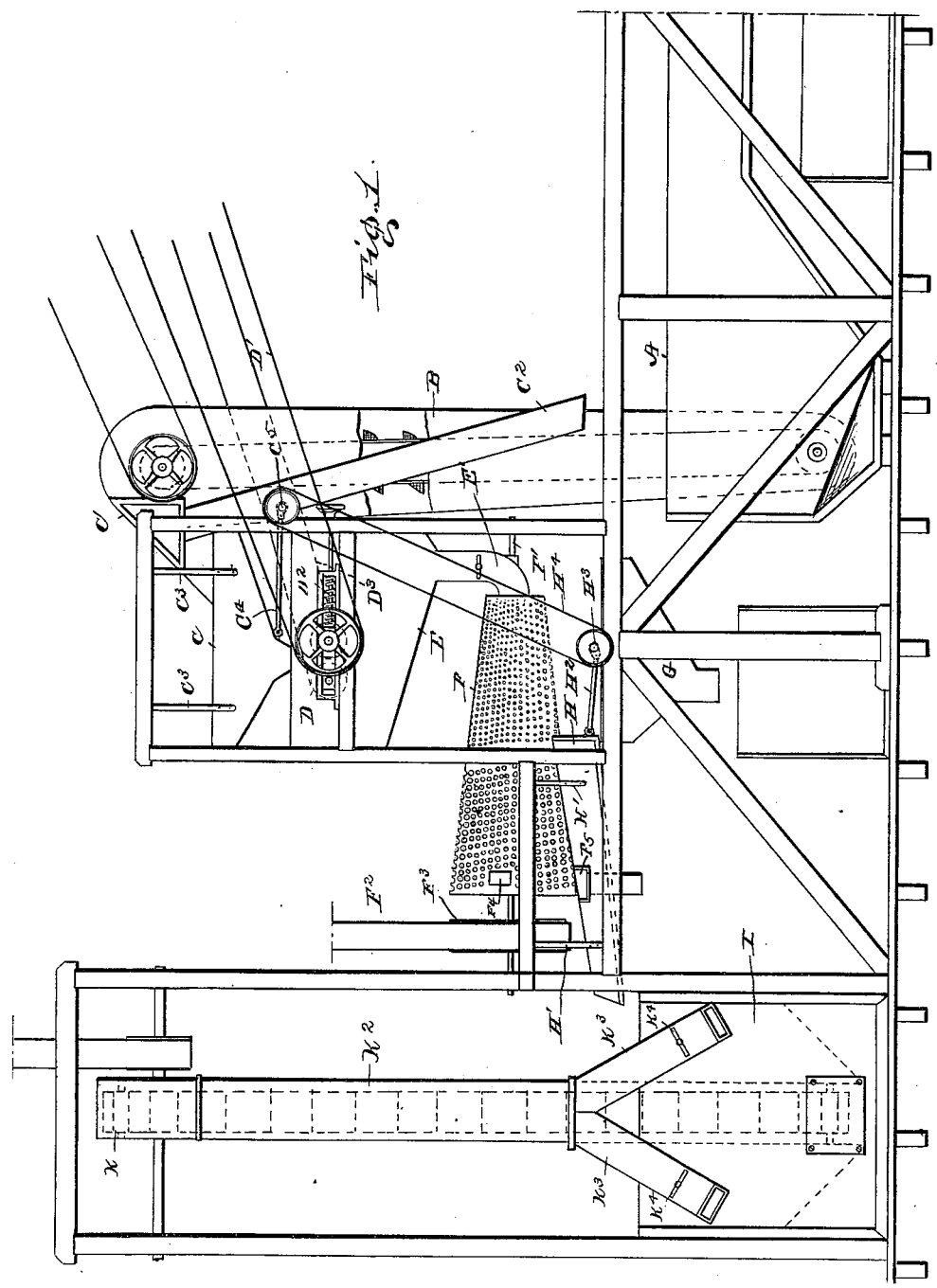
WITNESSES:
INVENTOR.
John F. Ulrichs.
BY
ATTORNEYS.

No. 650,999. Patented June 5, 1900.
J. F. ULRICHS.
MACHINE FOR SEPARATING SHELLS FROM KERNELS OF NUTS.
(Application filed Dec. 11, 1899.)
(No Model.) 2 Sheets—Sheet 2.
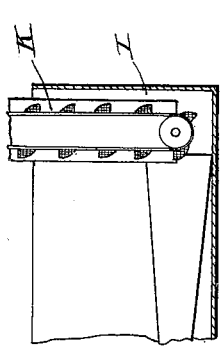
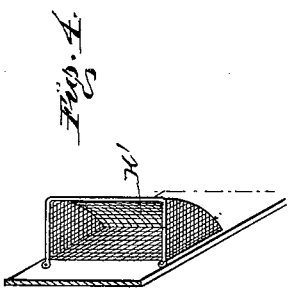
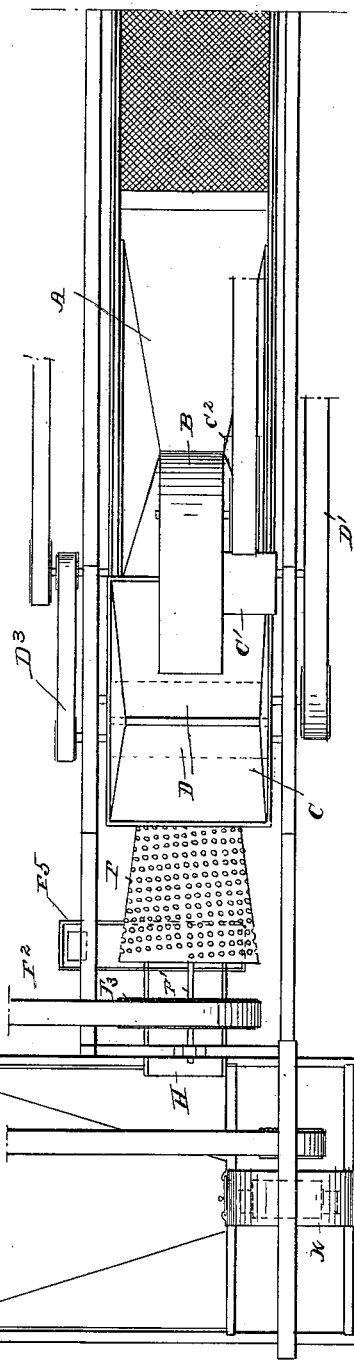
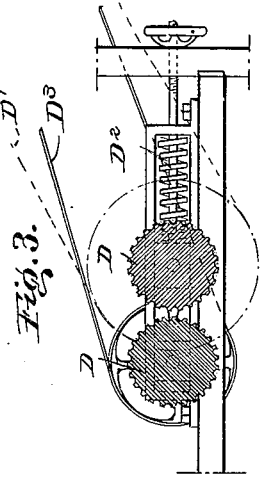
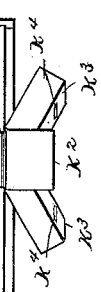
WITNESSES:
G. V. Marsh.
Harry A. Goodall.
INVENTOR.
John F. Ulrichs.
BY Murdock & Co.
ATTORNEYS.

UNITED STATES PATENT OFFICE.

JOHN F. ULRICHS, OF ALAMEDA, CALIFORNIA.

MACHINE FOR SEPARATING SHELLS FROM KERNELS OF NUTS.

SPECIFICATION forming part of Letters Patent No. 650,999, dated June 5, 1900.

Application filed December 11, 1899. Serial No. 740,026. (No model.)

*To all whom it may concern:*

Be it known that I, JOHN F. ULRICHS, a citizen of the United States, residing at No. 899 Union street, Alameda, in the county of Alameda and State of California, have invented certain new and useful Improvements in Machines for Separating Shells and Kernels of Nuts; and I do hereby declare the following to be a full, clear, and exact description of said invention, such as will enable others skilled in the art to which it most nearly appertains to make, use, and practice the same.

This invention relates to improvements in machines for separating the shells and kernels of nuts.

In the drawings, Figure 1 is a side elevation of a machine constructed in accordance with this invention. Fig. 2 is a plan view of the same. Fig. 3 is a detail view in section of the crushing-rolls. Fig. 4 is a detail in perspective of one of the elevator-buckets used in this invention. Fig. 5 is a detail vertical transverse section through the tank and its elevator.

To facilitate the description of the invention with reference to the drawings, we will assign the letter A to the receiving-hopper, wherein the nuts are deposited prior to being crushed. The bottom of this hopper is formed with inclined walls converging to the foot of the elevator B, the casing of which has an opening to permit the nuts to flow into the path of the buckets. By this elevator the nuts are carried upward and into the hopper C, which is likewise constructed with converging bottom walls to guide the nuts between the fluted rolls D D. The extension C' and chute C² leading down therefrom are provided to carry off any surplus which may be carried up by the elevator B and would otherwise crowd the rolls D. The chute C² leads back into the hopper A. The rolls D D, as shown in Fig. 3 of the drawings, are fluted, the grooves being designed to receive the nuts as the rolls are rotated. One of these rolls is driven by the belt D and the other by the belt D³, whereby said rolls are independently geared to cause one of the rolls to move faster than the other, thereby gradually applying the crushing strain upon the nut. This action permits the shell and kernel to pass from between the rolls immediately the nut is broken, and thus avoid mashing the kernel. One of the rolls is mounted in boxes set in guides, with compression-springs D² set behind them to force the rolls together. This construction prevents any undue pressure being exerted on the rolls by reason of an accidental feed of a small stone or other foreign material. To prevent the clogging of the throat of the hopper C, this hopper is mounted on swinging arms C³ and is connected by a rod C⁴ to a crank on the shaft C⁵. This shaft is driven and through the crank and connecting-rod vibrates the hopper, and thus prevents the throat of the same becoming clogged. After passing between the rolls D D the shells and kernels are dropped into the hopper E and conveyed thence by the chute E' to the inside of the revolving screen F. The screen F is flared to produce an inclined bottom and is perforated by holes graduated from small to large from the small to the large end. The screen is mounted on a shaft F', which is driven by a belt F², passing over a pulley F³.

In the operation of the machine when the broken shells and kernels are received in the screen F they are carried by the rotary action of the screen and the inclined bottom of the same to the larger and lower end of the same. In this action they are compelled to travel over the perforations of the screen. These perforations are so graded in size that those in the upper end are too small to pass the kernels, but sufficiently large to pass the smallest of the broken shells. This portion of the screen is located over the hopper G, which opens into a receptacle for these finely-broken shells or refuse. The forward portion of the screen has large perforations through which the kernels and medium-sized broken pieces of shell pass, and an opening F⁴, through which large pieces of shell and debris may pass to a chute F⁵ to be delivered outside the machine. The kernels and broken pieces which have passed through the said large perforations fall on a tray or chute H, which is inclined, and the forward end of which extends over a tank I. The inclination of the tray H is not sufficient to cause the shells and kernels to roll off by their own gravity. The tray is mounted on the arms H' and is connected by the rod H² to a crank on the shaft H³ to be vibrated by the rotation of the said shaft. The shaft H³ is driven by the belt H⁴, which connects it to the shaft C⁵. As the tray H is vibrated the kernels and shells resting on the same are separated and gradually thrown toward and delivered from the end of the tray and into the tank I.

The tank I is constructed with inclined floor, as shown in Fig. 1 in dotted lines and in Fig. 2 in full lines. The floor-sections pitch toward the lower end of the elevator K, which consists of an endless belt having buckets K', constructed of wire of open mesh, as shown in Fig. 4. The elevator operates to raise the shells from the bottom of the tank I, the open-wire construction permitting the water to drain as they are raised. The buckets are so arranged as to deposit their contents in the outer chute K², the lower end of which is divided into twin spouts K³, each having a shut-off gate K⁴, so that either or both might be used to deliver into suitable receptacles placed to catch the flow from either.

The tank I is suitably lined to hold water, which is made into heavy or strong brine by the addition of a suitable amount of salt. When sufficiently strong, the brine will float the kernels, while permitting the shells to sink. It is in this manner that the kernels and shells are separated. The kernels are extracted from the brine by being raised therefrom on open-meshed wire ladles or baskets. They are then given a bath in fresh water and placed on trays to dry before being packed for shipment.

Having thus described this invention, what is claimed is—

1. In a machine of the character specified the combination of rotary crushing-rolls adapted to break the shells of nuts when passed between the rolls; a movable screen having perforations at the initial end adapted to pass finely-broken shell and not the kernels; a suitable driving mechanism to move the said screen to distribute the shell and kernels over the surface of the screen; a vibratory tray to receive and spread the kernels and shell and deliver them to a liquid bath; and a tank to hold liquid adapted to float the kernels of the said nuts while permitting the shells to sink; substantially as described.

2. In a machine of the character specified the combination of rotary crushing-rolls adapted to break the shells of nuts when passed between the rolls; a movable screen having perforations at the initial end adapted to pass finely-broken shell and not the kernels; a suitable driving mechanism to move the said screen to distribute the shell and kernels over the surface of the screen; a vibratory tray to receive and spread the kernels and shell and deliver them to a liquid bath; a tank to hold liquid adapted to float the kernels while permitting the shells to sink; and an endless bucket elevator adapted to extract the said shells from the bottom of the said tank to deliver them to suitable receptacles outside the machine; substantially as described.

3. In a machine of the character specified the combination of rotary crushing-rolls adapted to break the shells of nuts when passed between the rolls; a movable screen having perforations at the initial end adapted to pass finely-broken shell and not the kernels; a suitable driving mechanism to move the said screen to distribute the shell and kernels over the surface of the screen; a vibratory tray to receive and spread the kernels and shell and deliver them to a liquid bath; a tank to hold liquid adapted to float the kernels while permitting the shells to sink; an endless bucket elevator adapted to deliver the whole nuts to the said crushing-rolls from a receiving-hopper; and an endless open-mesh wire bucket elevator adapted to extract the shells from the bottom of the said tank to deliver them to suitable receptacles outside the machine; substantially as described.

In testimony whereof I have hereunto set my hand this 4th day of November, 1899.

JOHN F. ULRICHS.

Witnesses:
  E. F. MURDOCK,
  G. W. MARSH.